US009223684B2

(12) United States Patent
Gittelman et al.

(10) Patent No.: US 9,223,684 B2
(45) Date of Patent: Dec. 29, 2015

(54) ONLINE APPLICATION TESTING ACROSS BROWSER ENVIRONMENTS

(71) Applicant: Microsoft Corporation, Redmond, WA (US)

(72) Inventors: Arye Gittelman, Mercer Island, WA (US); Zachary A. Nation, Seattle, WA (US); John W. Strick, Seattle, WA (US); Ajey P. Shah, Bellevue, WA (US); Michael B. Silverstein, Kirkland, WA (US); Aditi Mandal, Bothell, WA (US); Yubo Jia, Bellevue, WA (US); Alexander S. Spitsyn, Kirkland, WA (US); Emre Bogazliyanlioglu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 14/036,289

(22) Filed: Sep. 25, 2013

(65) Prior Publication Data

US 2015/0089299 A1 Mar. 26, 2015

(51) Int. Cl.
*G06F 11/00* (2006.01)
*G06F 11/36* (2006.01)

(52) U.S. Cl.
CPC .................................. *G06F 11/3688* (2013.01)

(58) Field of Classification Search
CPC ......................... G06F 11/3688; G06F 11/3672
See application file for complete search history.

(56) References Cited

U.S. PATENT DOCUMENTS

| 7,721,154 | B1* | 5/2010 | Jaamour et al. ............. 714/38.14 |
| 8,327,271 | B2 | 12/2012 | Miller |
| 8,490,059 | B2* | 7/2013 | Huang et al. .................. 717/125 |
| 8,819,630 | B2* | 8/2014 | Chen et al. ..................... 717/124 |
| 8,863,085 | B1* | 10/2014 | Stahlberg ....................... 717/124 |
| 8,875,102 | B1* | 10/2014 | Feng ............................... 717/124 |
| 2012/0198351 | A1 | 8/2012 | Lee et al. |

OTHER PUBLICATIONS

Holmes, et al., "Automating Functional Tests Using Selenium", Retrieved from <<http://ieeexplore.ieee.org/stamp/stamp.jsp?tp=&arnumber=1667589>>, In Proceedings of AGILE Conference, Jul. 23, 2006, 6 Pages.
Sexena, et al., "A Symbolic Execution Framework for JavaScript", Retrieved from <<http://www.eecs.berkeley.edu/Pubs/TechRpts/2010/EECS-2010-26.pdf>>, University of California, Technical Report No. UCB/EECS-2010-26, Mar. 8, 2010, 20 Pages.

(Continued)

*Primary Examiner* — Philip Guyton
(74) *Attorney, Agent, or Firm* — Tom Wong; Micky Minhas

(57) ABSTRACT

A stub can be loaded into a first browser environment of a browser application on a client machine, with the stub being loaded from a domain. The stub can execute to load an online application test into the first browser environment. Additionally, the test can execute in the first browser environment to conduct the test on an online application. For example, the test may be conducted from a second browser environment of the browser on the client machine. Performing the test can include loading one or more digital pages from the application into the second browser environment.

20 Claims, 9 Drawing Sheets

(56) References Cited

OTHER PUBLICATIONS

Kleivane, Tine Flaten, "Unit Testing with TDD in JavaScript", Retrieved from <<http://ntnu.diva-portal.org/smash/get/diva2:450286/FULLTEXT01>>, Doctoral Dissertation, Norwegian University of Science and Technology, Jul. 2011, 190 Pages.

Merchant, et al., "A Browser Agnostic Web Application UI Test Framework: Motivation, Architecture, and Design", Retrieved from <<http://ieeexplore.ieee.org/stamp/stamp.jsp?tp=&arnumber=5070710>>, In Sixth International Conference on Information Technology: New Generations, Apr. 27, 2009, 4 Pages.

Riley, et al., "Beautiful Testing: Leading Professionals Reveal How They Improve Software", Retrieved from <<http://deca.cuc.edu.cn/Community/cfs-filesystemfile.ashx/__key/CommunityServer.Components.PostAttachments/00.00.00.26.39/Beautiful-Testing.pdf#page=190>>, Oct. 29, 2009, 351 Pages.

Wang, et al., "Build an Auto Testing Framework Based on Selenium and FitNesse", Retrieved from <<http://ieeexplore.ieee.org/stamp/stamp.jsp?tp=&arnumber=5190273>>, In International Conference on Information Technology and Computer Science, vol. 2, Jul. 25, 2009, 4 Pages.

* cited by examiner

ONLINE APPLICATION TESTING ACROSS BROWSER ENVIRONMENTS

BACKGROUND

Online applications such as Web applications can be tested using an online computer application testing automation software framework or application. Because Web applications are primarily accessed through browser applications (browsers), such testing applications can interface with and run tests on browsers.

Some testing applications have utilized scripting languages, such as JavaScript, by injecting scripts into the application being tested (i.e., application under test). Specifically, such scripts are typically injected into the Web pages that are to be served by the application under test.

Other testing applications conducted tests by using a user interface layer to send messages to a browser. Such testing applications can feed user interface events to the browser (e.g., an instruction to click on a particular button in a Web page). Such testing applications have a different specialized adapter for each different browser type (Internet Explorer® browser for the Windows® operating system, Internet Explorer® browser for the Windows® Phone operating system, Firefox® browser for Windows® operating system, Firefox® browser for Android™ operating system, etc.) and for different versions of the same browser type.

Online application testing systems have orchestrated automatically performing tests of an online application on multiple computing machines in response to a single user input command. Also, testing systems have monitored and reported performance statistics, such as different page loading times with and without use of a cache, etc.

SUMMARY

The tools and techniques discussed herein relate to computer testing of online applications. The tools and techniques can include using a stub in one browser environment to test an online application, such as where the online application is tested in a different browser environment. A stub is a software component that is configured to receive and conduct online application tests by interacting with products in browser environments, such as interacting with one or more Web pages being tested. For example, the Web page(s) may be one or more digital pages received from an online application that is being tested. The stub may also be configured to interact with a harness.

A harness is a software component that is configured to host a stub and to interact with the stub. These components may also be configured to perform additional functions. For example, a harness may be configured to present a user interface to receive user input to govern a test and/or to report test results. A browser environment is a computer environment provided by a browser. Different browser environments or separate browser environments refer to environments that have some degree of separation from each other. For example, different browser environments may be two different windows (e.g., two totally separate windows, or two tabs in a tabbed browser) of a browser running in a computing machine. As another alternative, different browser environments may include a browser window and an inline frame within that window, an inline frame and another inline frame within that inline frame, etc.

In one embodiment, the tools and techniques can include loading a stub into a first browser environment of a browser application on a client machine, with the stub being loaded from a domain, which can be remote from the client machine. The stub can execute to load an online application test into the first browser environment. Additionally, the test can execute in the first browser environment to conduct the test on an online application. For example, the test may be executed in the first browser environment to test the online application from a second browser environment of the browser on the client machine. Performing the test can include loading one or more digital pages from the application into the second browser environment.

As used herein, a domain is a set of computing resources in a computer network such as a global computer network (e.g., the Internet), where the set of computing resources corresponds to a domain name registered with a domain name service for the computer network. Accordingly, the same domain corresponds to the same registered domain name and a different domain name corresponds to a different registered domain name. For example, the computing resources referenced by bing.com/news (e.g., with the uniform resource locator http://www.bing.com/news) and bing.com/maps are considered to be in the same domain, but computing resources referenced by bing.com and uspto.gov are considered to be in different domains.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
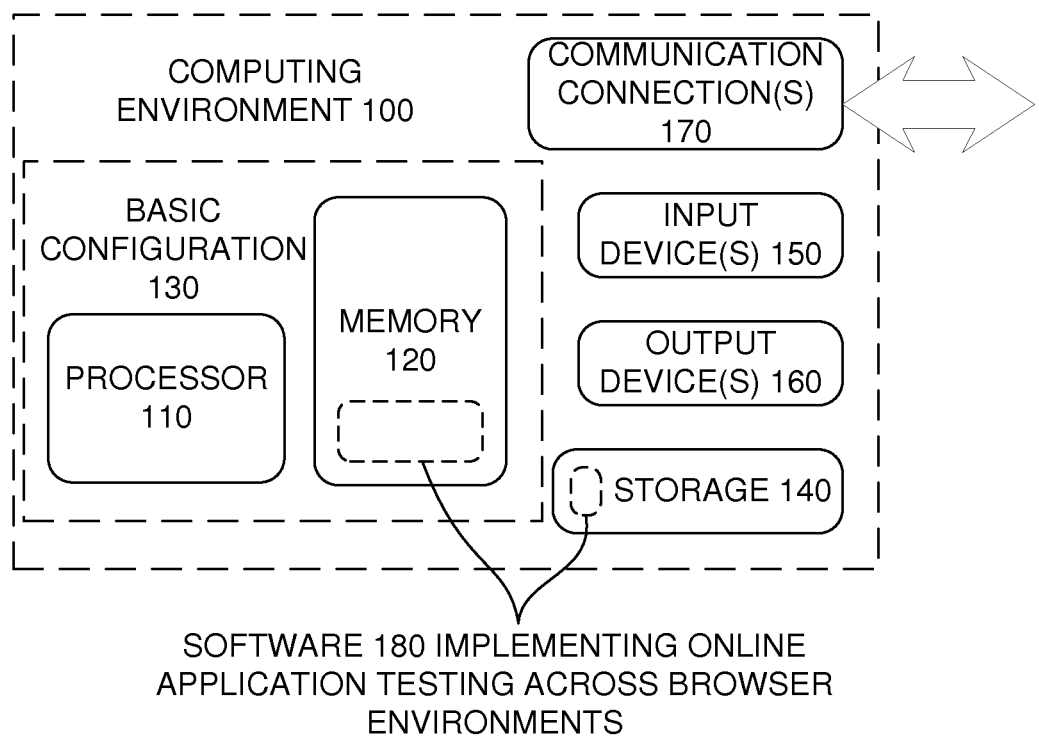
FIG. 1 is a block diagram of a suitable computing environment in which one or more of the described embodiments may be implemented.

Embodiments described herein are directed to techniques and tools for improved testing of online applications in browser environments (such as Web browser environments within a Web browser). Such improvements may result from the use of various techniques and tools separately or in combination.

Such techniques and tools may include executing tests using a stub that can be loaded from the same domain as a domain where the online application being tested is located. In one implementation, the stub can be loaded into a harness, such as in an inline frame in the harness. The stub can be a simple page that can load and run a test. The use of the stub from the domain of the application under test can allow a test to execute in the same domain as the application under test (because the stub that conducts the test is loaded from the same domain as the pages from the application under test). Accordingly, the test can run using scripting between the stub and pages loaded from the application under test. For example, such scripting may include scripting to load a page from the application under test, scripting to select a user interface element on the page, etc. This scripting can be performed without running afoul of cross-site-scripting (XSS) limitations that are imposed by many browsers because the stub and the page being tested are loaded from the same domain.

The stub, the harness, the tests, and other components discussed below can be defined at least in part using a scripting language that can be executed by multiple different types of browsers. For example, the scripting language can be a widely used scripting language such as JavaScript.

Additionally, the stub can be included in code that is shipped for an application (e.g., those that are already operating on a global computer network). Accordingly, the stub can be available to be loaded in a client machine to perform tests on the application even after the application is shipped. This can even be done with tests that are authored after the application has been shipped because the tests can be loaded from domains other than the domain for the application being tested.

Because tests run in the context of the stub, which may be in a different browser environment from the product code in some examples (e.g., pages loaded from the application under test), the test code can be isolated from the product code. This can allow tests to be run without injecting test code into the product code, which can alter the state of the product code and lead to false positives (i.e., false indications of problems with the application under test). In some scenarios, a second browser environment may not be used. For example, for unit tests, a file may be loaded directly in the stub's browser environment, and application programming interfaces of the online application being tested can be called in that file. In other scenarios, the second browser environment may be used to provide benefits, such as allowing the product code to be run in its own isolated browser environment.

Tests can be hosted in a domain separate from the domain for the application under test and the stub, although the tests could be hosted in that domain. Indeed, tests can be hosted from any available server on any available domain. Accordingly, the tests need not be shipped with the application under test or included in the product under test. Additionally, the tests can run from any domain, including customer domains.

The stub and the harness can collect and measure page load time performance when navigating to page URLs during a test. Such load times can include PLT1 (page load time without caching), PLT2 (page load time when the page has been cached), and/or PLT3 (load time for retrieving data for an already-loaded page, such as for updating the data).

The stub or the harness can have a built-in task queue processor so that tests can write 'tasks' that can execute one after the other. This can simplify the programming model for the tests by avoiding the need to use and keep track of numerous callback events in a test. Each task can have an optional 'waiter' that determines when the task has finished. This can produce the benefit of improving efficiency by avoiding the need for hard-coded 'sleeps' and by helping to improve the speed of the test execution.

For browsers that only allow one window to be active at a time (e.g., many mobile device browsers), tests can be run by loading the product pages into an inline frame inside the inline frame that hosts the stub. This technique can facilitate tests using such browsers, while still allowing for page transitions without losing state because the product code from the application under test is running in the inline frame that is separate from the inline frame of the stub where the code for the test is being executed.

The tools and techniques can include a client service running outside the browser but on the same machine as the browser. This client service may perform various operations to facilitate running the tests. For example, the client service can host all or part of the files needed by the harness and the stub for running tests, so that a special server is not needed to host the harness and the stub. As another example, the client service can perform tasks that cannot be performed within at least some browsers (e.g., drag and dropping to and from locations outside the browser, file uploads, dismissing dialogs, clearing the browser cache, taking screen shots, etc.). In some situations, some types of browsers may be able to perform some actions themselves, while other types of browsers may be unable to do so. In such instances, the client service may perform a task when testing with some types of browsers and not others. For example, some types of browsers may be able to clear the browser cache from within the browser, but other types of browsers may not allow this to be done from within the browser. As another example of a use of the client service, the client service can launch and close a browser to run tests automatically on a client machine (such as when using the orchestration service discussed below). As yet another example, the client service may request cookies from an authentication provider and pass those cookies to the browser to log in as user(s). As yet another example, the client service may listen for both HTTP and HTTPS requests to match the protocol of the online application under test.

The tools and techniques may also include a deployable service for orchestrating automatic test execution on multiple machines, which may be performed in response to a single user input. For example, different types of devices and browsers can register with the service to execute tests. When user input is provided to request that a set of tests be run on multiple machines, the orchestration service can automatically respond by instructing multiple client machines that are registered with the service to perform the requested test. This can involve a test being executed in parallel on multiple machines, including different types of devices and/or different types of browsers. These tests can be run in browsers on machines that are local and/or remote to the orchestration service. For example, some such tests may be performed on client machines in the cloud that are managed by a third party that is a separate entity from an entity that is managing the orchestration service. If browsers become unresponsive while running a test, the orchestration service can remotely restart such browsers.

The tools and techniques may include storing information about previously populated data for future use (e.g., for use in future tests), such as in non-volatile memory or possibly in volatile memory. Accordingly, such data may be re-used for future tests instead of re-populating the data for each test. Such re-use of data can improve efficiency when running multiple tests that can use the same data.

The harness and the stub may provide a debugging mode. For example, user input may be provided in the harness to indicate that debugging mode is to be used for a test. The debugging mode can include one or more changes from regular test operations to improve efficiency in debugging. For example, the debugging mode may force exceptions to be thrown and break when exceptions occur, rather than catching exceptions and continuing execution through exceptions. As another example, the debugging mode may include breaking into the debugger automatically after the test is loaded into the stub, which can allow a user to set break points in the test.

The tools and techniques may also include utilizing configuration files to communicate settings for a test. For example, a configuration file may be communicated to the harness to customize settings for a test (e.g., test selection, location of the application under test, harness settings, etc.).

The tools and techniques may include running a single test in response to a single user input gesture, or responding to a single user input gesture by running a single test multiple times, or running multiple tests multiple times in response to a single user input gesture (e.g., a single click, etc.).

Accordingly, one or more substantial benefits can be realized from the tools and techniques described herein, such as the technical benefits discussed above.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a client machine, and/or a server machine in a product domain, harness source domain, test source domain, and/or orchestration service. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing online application testing across browser environments. An implementation of online application testing across browser environments may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. System for Online Application Testing Across Browser Environments

A. Overall System Architecture Example

Figure 2:
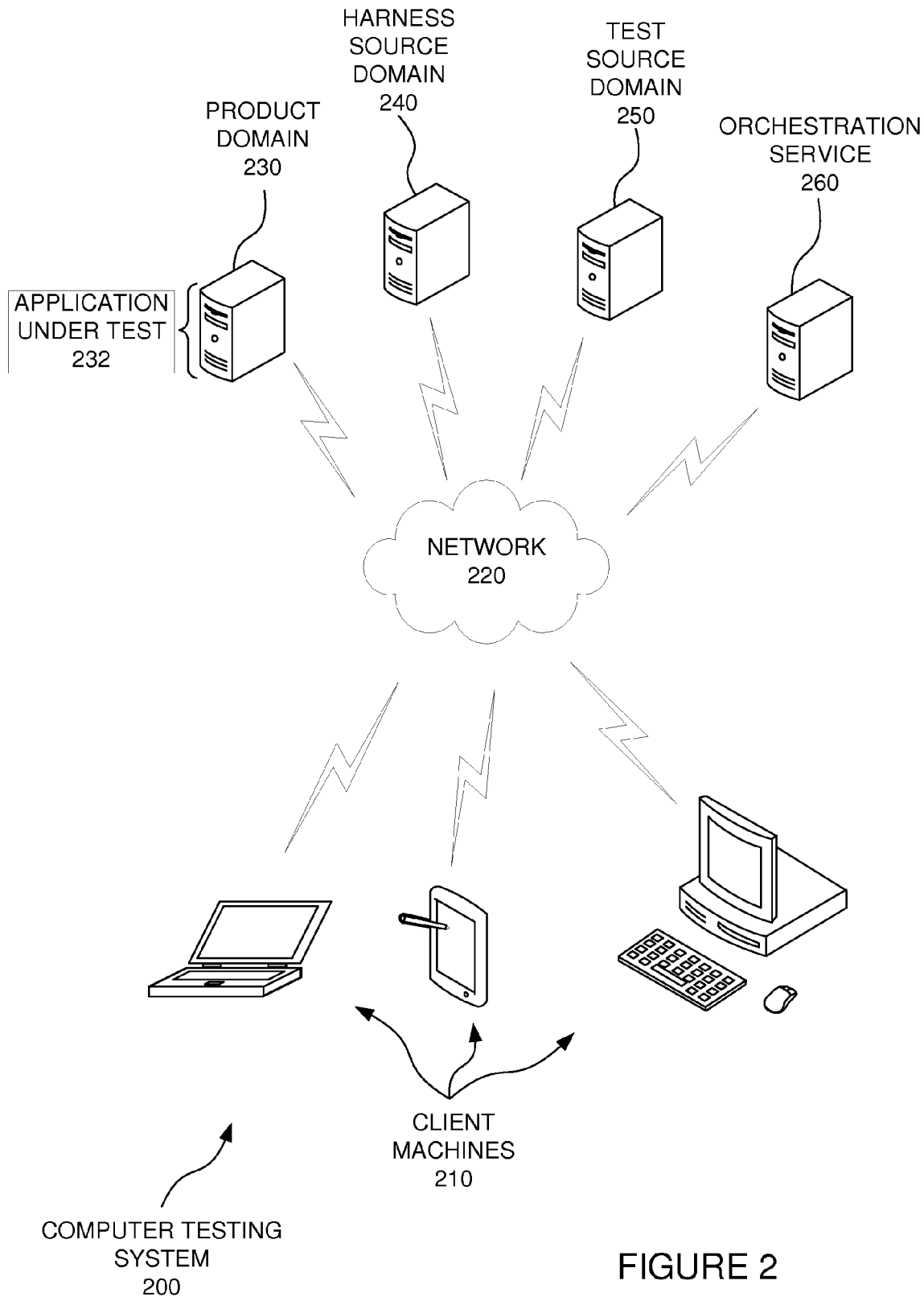
FIG. 2 is a schematic diagram of an online application testing system.

FIG. 2 is a schematic diagram of an environment or system (200) in conjunction with which one or more of the described embodiments may be implemented. The system (200) can include one or more client machines (210), which can operate to perform client-side testing of online computer applications. The client machines (210) can connect to a computer network (220), such as a global computer network, to communicate with other computing resources operating on remote computing machines that are also connected to the computer network (220). The other computing resources connected to the network (220) can include server resources, such as a product domain (230), which can host an application under test (232). For example the application under test (232) can be a Web application that is to be tested using tools and techniques discussed herein using one or more of the client machines (210). Accordingly, the application under test (232) can provide products, such as Web pages, to the client machines (210), such as in response to requests from the client machines.

The server resources can also include a harness source domain (240), which can provide harnesses to the client machines (210). Additionally, the server resources can include a test source domain (250), which can provide tests to the client machines (210). The server resources can also include an orchestration service (260), which can receive requests from the client machines (210) to perform tests on multiple browsers and multiple machines. The orchestration service (260) can also respond to such requests by orchestrating such performance of tests on multiple browsers and/or computing machines.

Alternatively, the functions of one or more of the server resources (230, 240, 250, and/or 260) may be combined in a single domain. For example, harnesses and tests may be provided from the same domain. Similarly, the orchestration service (260) may be provided from a domain that also provides harnesses and/or tests. Indeed, the harness source, test source and/or orchestration service may even be in the same domain as the application under test in some scenarios.

B. Example of Client System Architecture

Figure 3:
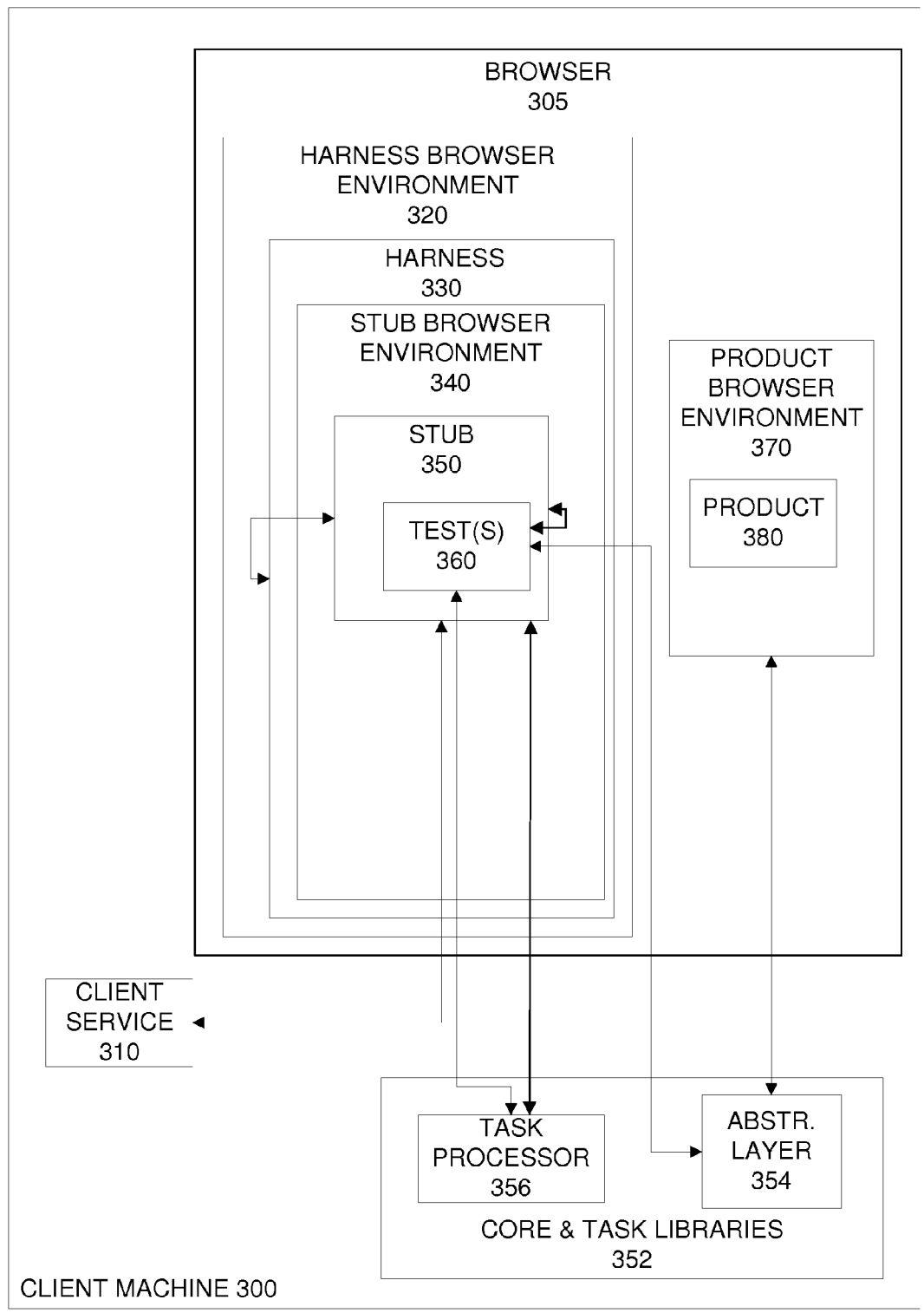
FIG. 3 is a block diagram of a client machine.

Referring now to FIG. 3, computing components of a client machine (300) are illustrated in block form. The client machine (300) can host a browser (305) and a client service (310) running outside the browser (305). The browser (305) can be a browser that can interpret and execute instructions in a scripting language, and components within the browser can utilize that scripting language.

The browser (305) can host multiple browser environments, which can be at least partially isolated from each other. For example, the browser (305) may be configured to simultaneously have multiple open browsing windows, multiple open browsing tabs, inline frames within one or more open browsing windows, etc.

Figure 4:
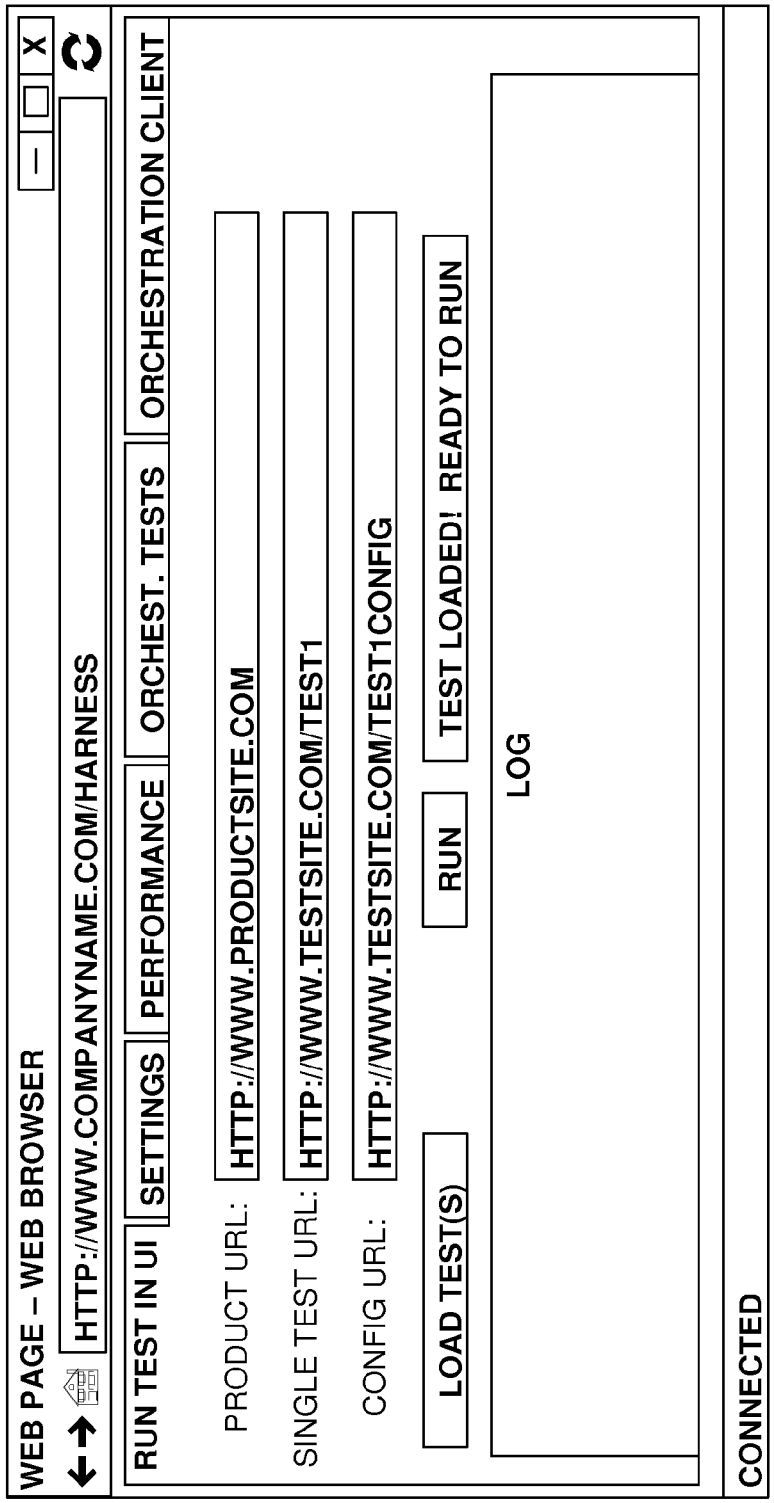
FIG. 4 is an illustration of a harness user interface.

The browser (305) can open a harness browsing environment (320). For example, a user may provide user input to the browser (305) to open a browser window, and may provide user input in that browser window to navigate to a harness source, such as by providing a uniform resource locator for a location of the harness source, prompting the browser to send a request such as a HTTP "get" request. The harness source can respond by providing the harness (330) to the browser (305), which can load the harness (330) in the harness browser environment (320). For example, the harness (330) can be a Web page, such as an ASPX or HTML page that includes JavaScript for handling test execution as discussed herein. The harness (330) can allow several settings to be input, such as a product location, a test location, an identification of tests to run, a username to use, etc. The harness (330) can provide a user interface (400) (an example of which is illustrated in FIG. 4) that displays results from tests that have been run. For example, the user interface (400) can include tabs that show results from performance runs (the PERFORMANCE tab). The user interface (400) may also have tabs that show that current status of multiple test orchestration and the results of runs that have executed previously using a test orchestration service with the client machine (300) running and/or requesting such tests (see the ORCHEST. TESTS tab and the ORCHESTRATION CLIENT tab).

The harness (330) can also host a stub browser environment (340). For example, the stub browser environment (340) may be an inline frame in the harness (330) (e.g., an inline frame represented by the box in FIG. 4 that reads "TEST LOADED! READY TO RUN"). The harness (330) can retrieve and load a stub (350) into the stub browser environment (340). For example, the harness (330) may be prompted to do so after being provided with a location for the stub in a product domain (e.g., a uniform resource locator for the stub in the product domain). Accordingly, the harness (330) can send a request for the stub (e.g., by sending a HTTP get request using the browser (305)).

The stub (350) can be a simple Web page, such as an ASPX or HTML page, which allows messages to be sent back and forth between the harness and the stub, and that allows the stub to perform other actions, such as loading core and task libraries (352), which can be loaded from a different domain than the domain from which the stub was loaded. The core and task libraries (352) can include code for various tasks and components for executing tests, such as an abstraction layer (354) and a task processor (356). Accordingly, the core and task libraries (352) can include instructions, such as in the form of JavaScript files, which can control execution of tests (360) from within the stub browser environment (340), including loading the file (such as a file including JavaScript) for the test (360), initializing the task processor (356), starting the test (360), and collecting logs from the test execution. The core and task libraries (352) can also include a common library that can execute basic tasks on any browser that supports the scripting language used for the components of the libraries (352) (such as JavaScript), such as finding an element on a Web page, clicking an element on a Web page, navigating to pages, waiting for pages to render, etc. The core and task libraries (352) are shown outside the browser (305) because they can be loaded as external file(s) in some implementations. However, all or part of the code from the core and task libraries (352) can be loaded into one or more environments in the browser (305) to facilitate execution of such code in some situations.

The harness (330) can send the stub (350) a location of the test (360) to execute. The harness (330) can also send the stub (350) settings that are used while executing the test. The stub (350) can send messages to the harness (330), such as results from test execution. For example such results may be sent to the harness (330) in a scripting language, such as in the form of a JSON blob. The harness (330) and the stub (350) may be loaded from different domains. However, cross-domain communication may still be conducted between the harness (330) and the stub (350) in such a scenario, such as by using the known postMessage method.

A running test (360) can make calls to the abstraction layer (354) to launch and communicate with a product browser environment (370), which can host a product (380) (e.g., Web pages retrieved from the online application under test). The abstraction layer (354) can determine whether to launch the product browser environment (370) as a separate window from the stub browser environment (340) (as illustrated in FIG. 3), or to launch the product browser environment (370) as an inline frame within the stub browser environment (340). For example, the abstraction layer (354) may be configured to determine whether the type of browser (305) being used will support multiple windows simultaneously being active. If so, then the product browser environment (370) can be launched as a separate window. If not (e.g., if the browser (305) does not support the concept of separate windows and if the client machine (300) will suspend execution of scripts in non-active browsers or non-active tabs to save battery life), then the product browser environment (370) can be launched as an inline frame within the stub browser environment (340). During the launch and testing, the test (360) can communicate with the product (380) through the abstraction layer (354), so that the abstraction layer (354) can abstract away from the test (360) details of differences between dealing with the product browser environment (370) as a separate window versus dealing with the product browser environment as an inline frame within the harness browser environment (320) (such as within the stub browser environment (340) in the harness browser environment (320)). For example, the test (360) can communicate with an object (produced by the abstraction layer (354) in this example), which can include the product browser environment (370). The test (360) can communicate with this object in the same manner, whether the object includes a separate window or an inline frame.

This feature of optionally launching the product browser environment (370) as an inline frame in the stub browser environment (340) can get around issues with some browsers, such as immersive browsers. As can be seen from the discussion herein, the stub browser environment (340) and the product browser environment (370) are typically active at the same time while tests are being performed. However, for immersive browsers, a new tabbed browser is open instead of a new window, since there is no concept of a window for immersive browsers. This can pose a problem because many mobile devices will suspend any executing script, such as JavaScript, on non-active tabbed browsers to save battery life. Because the test code is executing on the harness page (in the stub browser environment (340) within the harness browser environment (320)), this can effectively hang test execution.

By creating the product browser environment (370) as an inline frame within the stub browser environment (340) (which can itself be an inline frame within the harness browser environment (320)) instead of opening a window, a new window need not be opened to navigate to the product (380). Instead, the browser (305) can be instructed to navigate to the product (380) directly with an inline frame on the harness page (this configuration is not illustrated in the figures). This can still allow for maintaining state during page transitions in the product (380) in immersive browsers on mobile devices, without causing the device to suspend the test execution (which can, for example, be JavaScript executing in the stub browser environment (340)).

Some examples of features that may be used with online application testing across browser environments will now be discussed in more detail. These features include test execution, the task processor, the client service, performance monitoring, and automated test orchestration.

C. Test Execution

Referring to FIGS. 3-4, to execute a test, the browser (305) can navigate to the harness user interface (400). On the harness user interface (400), user input can be provided to enter a uniform resource locator of the product to test and a uniform resource locator of the test server that is hosting the test files. The harness (330) can attempt to load the test stub (350) from the product server uniform resource locator within the inline frame hosted in the harness (330). If loading of the test stub is successful, a message can be displayed, indicating that the system is ready to run tests.

Next, a configuration file can be loaded. The configuration file can include available tests that can be run. A list of such tests may be displayed on the harness user interface (not shown in FIG. 4). User input can be provided to select which set of tests to run, and a user input action (e.g., a click on the run button) can instruct the harness (330) to proceed with the test. In response, the harness (330) can post a message to the stub (350) identifying the test to execute and any run time settings that have been selected (such as maximum run time, uniform resource locator of the client service (310), etc.). In response to this message, the stub (350) can then load the core and task libraries (which can be JavaScript files) (352) and the test(s) (360) (which can also be JavaScript files) from the test server location in the test source domain (250) (see FIG. 2). The stub (350) can then call into the test code that is loaded into the stub browser environment (340) to begin execution of the test (360). The test (360) can then go through the abstraction layer (354) to open the product browser environment (370) (either a new window or inline frame) and navigate to the product (380) in that product browser environment (370). By opening a new window or inline frame, the system can allow the test to navigate to different product pages indicated by different uniform resource locators without losing state. This is because the code for the test (360) is executing in a separate browser environment (340) from the browser environment (370) for the product (380) being tested.

After the test (360) finishes executing, the test (360) can post a message back to the harness (330) with the logs from the run. If all tests (360) have finished executing, the tests (360) can post a message back to the harness (330) that the test run is finished. The harness (330) can parse the logs after each individual test is run and either log the results to the harness user interface (400) or post the logs back to the orchestration service (260) if running in unattended mode. The interactions of the executing test (360) with the product (380) and the harness (330) can be facilitated by the stub (350) and/or the core and task libraries (352).

D. The Task Processor

As discussed above, the core and task libraries (352) can include a core file (which can be a JavaScript file) that contains the task processor (356), which can simplify writing of the tests (360). Some scripting languages that may be used for writing tests, such as JavaScript, execute to produce a single-threaded and synchronous process. Accordingly, writing code in such scripting languages can involve using numerous timers and callback methods. Such code can be difficult and cumbersome to write. Instead of having tests written in such a manner, the task processor (356) can execute tasks sequentially so that the test author does not need to worry about timers and callback methods.

Figure 5:
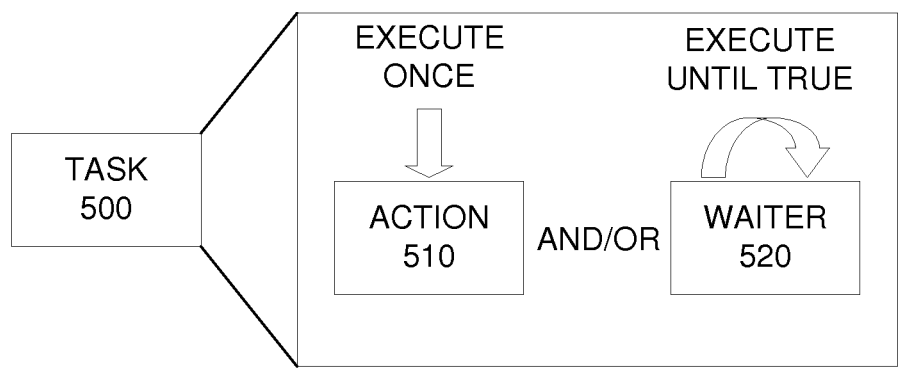
FIG. 5 is a schematic diagram of a task including an action and/or a waiter.

Referring now to FIGS. 3 and 5, a task (500) is illustrated in FIG. 5. The task (500) can include an action (510) and/or a waiter (520). The action (510) is a function that does something (e.g., click a button). The waiter (520) is a function that determines that specified event(s) have occurred (e.g., the page navigation has completed). The waiter (520) can return a Boolean operator that indicates whether the event has occurred. When each task (500) is executed, the task processor (356) is invoked to first call the action (510). When the action (510) is complete, the task processor (356) can start a timer and periodically call the waiter (520). The task processor (356) can continue to call the waiter (520) as long as the waiter (520) returns false. When the waiter (520) returns true, the task processor (356) can stop the timer, stop calling the waiter (520), and begin executing the next task (500). Tasks (500) that have an immediate effect upon their completion of the action (510) may not have a waiter (520). Tasks (500) that do not have an immediate effect can have a waiter (520) to wait for an effect of the action (510). Waiters (520) can look for data changes, rather than sleeping for a period of time. As an example, consider a task (500) that loads a Web page. The action (510) can request the page to be loaded. When the request is made, the action (510) is completed, but the test may want to wait until the page is actually loaded before considering the task (500) to be completed. So, once the action (510) is done (the page has been requested), the task processor (356) can call the waiter (520) for the task. For example, the waiter (520) may wait for a particular page element with a particular identifier to be loaded. When that element is loaded, the waiter (520) will return as true, and the task processor (356) can move on the next task. A task (500) may have an action (510) and a waiter (520), only an action (510), or only a waiter (520) (where the task (500) will just wait for something to happen).

Figure 6:
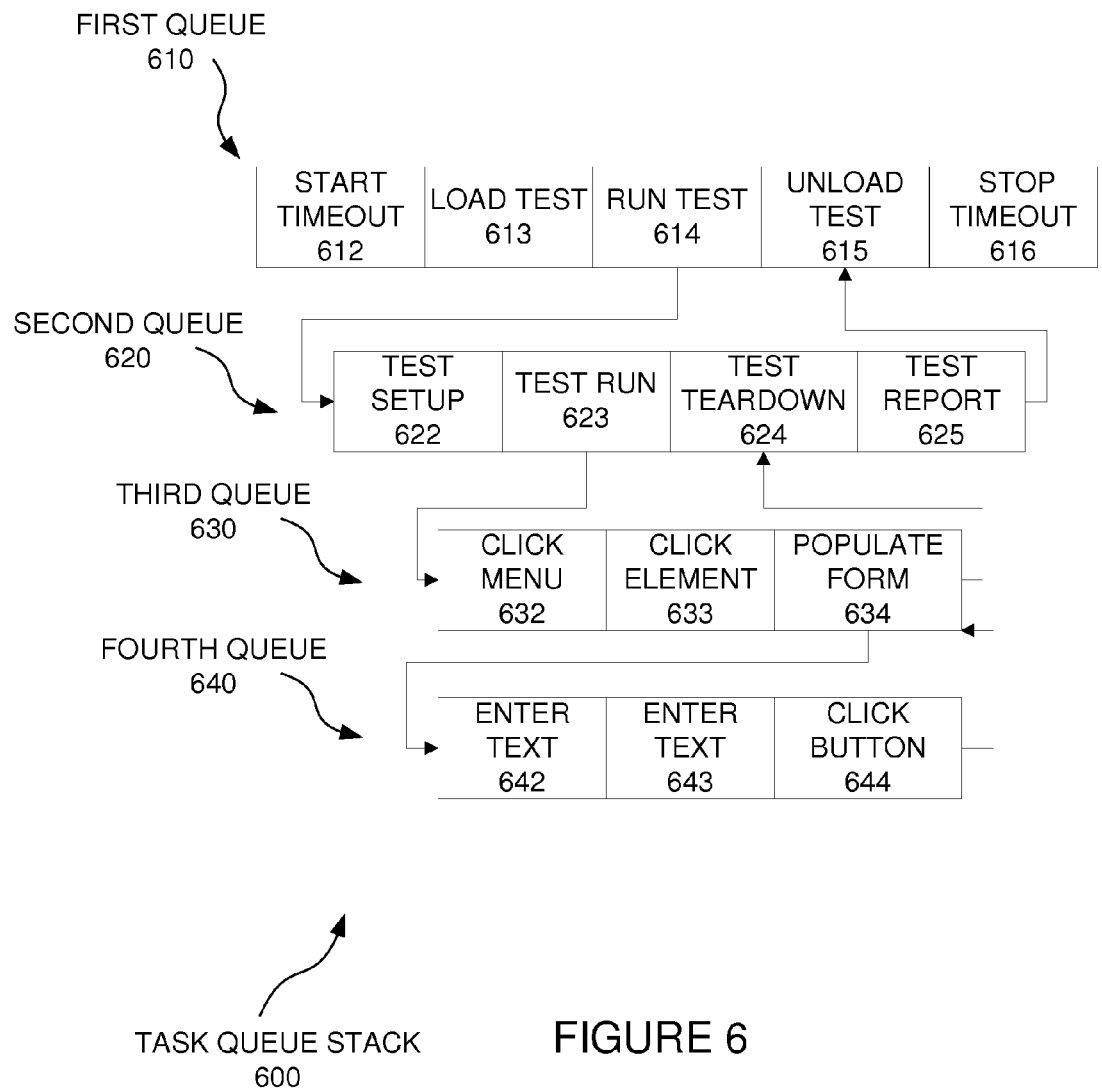
FIG. 6 is a schematic diagram of a task queue stack.

Referring now to FIGS. 3 and 6, the task processor (356) can hold a task queue stack (600). The stack (600) can include multiple task queues (610, 620, 630, and 640), and each task queue can include at least one task specified in the test (either directly or indirectly through one or more other tasks specified in the test). Each new task can be inserted into a task queue (610, 620, 630, or 640), and each task can have its own queue when it is running. The task queues (610, 620, 630, and 640) can be performed in a last-in-first-out order (the last queue added to the stack (600) is performed first, etc.). Accordingly, when an additional queue is added to the stack (such as in response to a running task in an existing task in an existing queue calling for the addition of the additional queue), the additional queue can be run before continuing with running the existing queue(s) in the stack (600). Within a task queue (610, 620, 630, or 640), the tasks can be performed in an order specified in the test or within the core and task libraries (352) (e.g., specified in the running task that called for the addition of the queue (610, 620, 630, or 640)).

As a general example, if a function F( ) adds tasks A and B, there can be a single queue containing A and B, and A can be the first task that is executed. When A is executed, A can get its own queue and the task processor (356) can wait to execute B until all the tasks in A's queue have completed. If while executing task A, task C is added to the queue, then C can be the next task executed. The task processor (356) can wait to execute B until A has finished executing and all of the tasks that A has added while it was executing have finished. In this way order can be maintained, and tasks and subtasks can be executed in a proper order.

Referring still to FIGS. 3 and 6, a specific example of a task queue stack (600) illustrated in FIG. 6 will be discussed. In this example, a first queue (610) is added to the stack (600). The first queue (610) includes the following: START TIMEOUT task (612), LOAD TEST task (613), RUN TEST task (614), UNLOAD TEST task (615), and STOP TIMEOUT task (616), in that order. The task processor (356) can execute the START TIMEOUT task (612), LOAD TEST task (613), and the RUN TEST task (614). The RUN TEST task (614) adds a second queue (620), which includes a TEST SETUP task (622), a TEST RUN task (623), a TEST TEARDOWN task (624), and a TEST REPORT task (625). The task processor (356) can execute the second queue (620) in the specified order. However, the TEST RUN task (623) can execute to instruct the task processor (356) to add a third queue (630), which includes a CLICK MENU task (632), a CLICK ELEMENT task (633), and a POPULATE FORM task (634). The task processor (356) can execute the third queue (630) in the specified order. However, the POPULATE FORM task (634) can execute to instruct the task processor (356) to add a fourth queue (640), which includes an ENTER TEXT task (642), another ENTER TEXT task (643), and a CLICK BUTTON task (644). The task processor (356) can execute the fourth queue (640) in the specified order.

Upon completion of the fourth queue (640), the fourth queue (640) can be removed from the task queue stack (600), and the task processor (356) can resume at a specified point in the third queue (the task processor (356) can maintain a pointer to a current execution point in each queue and can continue from that point when returning to that queue). Upon completion of the third queue (630), the third queue (630) can be removed from the task queue stack (600), and the task processor (356) can resume at the specified point in the second queue (620) (at the next task, the TEST TEARDOWN task (624)). Upon completion of the second queue (620), the second queue (630) can be removed from the task queue stack (600), and the task processor (356) can resume at the specified point in the first queue (610) (at the next task, the UNLOAD TEST task (615)). The task processor (356) can then complete the remaining tasks in the first queue (610).

E. The Client Service

Referring back to FIG. 3, the client service (310) can perform multiple functions.

For example, the client service (310) can host the harness (330), as well as the stub browser environment (such as a stub inline frame). Additionally, the client service (310) can serve up files, such as the files for the core and task libraries (352) and/or the test(s) (360), to the harness (330) and the stub (350). These files may be located on the client machine (300), but they can be hosted on a server remote from the client machine in some scenarios. This function of the client service (310) of handling the files on the client machine can produce some benefits. For example, the files for the online application testing need not be deployed with the application being tested, except that the stub (350) can be located in the same domain as the application being tested so that it can be loaded from that domain. Also, the files for testing can be copied onto a client machine (300) to execute tests against a product server that has a stub (350) deployed. This can be done without installation or dependency on other tools, besides the browser (305). A test may be executed by a user with little expertise. Additionally, authoring tests and debugging tests can be performed relatively easily because the files can be quickly copied to a client machine (300) and changes made to the files for test(s) (360) on the client machine (300) can be immediately available in the browser (305) because requests can be served up by the client service (310).

Another function of the client service (310) can be to perform tasks that are not allowed from within the browser (305). Because the harness (330) and stub (350) can execute completely within the browser (305), the browser (305) may have restrictions on what actions can and cannot be performed. For instance, from within the browser (305) itself, components typically cannot drag and drop a file from outside the browser (e.g., from a desktop or operating system folder), capture a screenshot, access the file system, dismiss dialogs, etc. When a test (360) is to perform one of these actions, it can send an HTTP request to the client service (310) to perform the requested action (e.g., take a screenshot). The test (360) can wait for the client service (310) to do the action and to respond that the action has been completed. The test (360) can then continue its execution. Thus, the client service (310) can allow a test (360) to perform an action that the test (360) normally would not be able to perform if the test was only executing within the browser (305).

A third function of the client service (310) can be to take a screenshot whenever the test (360) requests it (as discussed above), or when the test (360) reports a failure. For example, the stub (350) and harness (330) can automatically make a call to the client service (310) when a failure is encountered. The client service (310) may also take a video of the user interface of the product browser environment (370) as the test (360) is executing. Both of these can be used in debugging failures.

The client service (310) may also launch browsers (305) and run tests (360) automatically. This automated running may be useful where the client service (310) plugs into an existing harness so that tests (360) can be run automatically at a specified interval (e.g., every single day) or whenever a new build is produced. Also, the client service (310) can launch a browser (305) to automatically register with an orchestration service (260) (see FIG. 2) so that the client machine (300) can run tests submitted by others, as will be discussed more below.

Moreover, the client service (310) can be used to request authentication cookies from an external service. Many products require users to log-in, and this feature can be useful to be able to test as users with different levels of permission. The test (360) can request the client service (310) to make a call to get an authentication cookie from the authentication provider. The client service (310) can then send the cookie to the test (360) within the browser (305). The test (360) can then use the cookie to impersonate another user so that multi-user scenarios can be tested. If there is no client service (310) available on the local client machine (300), this can also be done from an instance of the client service (310) running on another machine because the request for a cookie can be made without access to the local client machine (300).

For some platforms (e.g., mobile platforms) where it is too expensive or unnecessary to write a client service (310) to run on that platform, the client service (310) can be hosted on another machine. The client machine (300) can then navigate to this service to access the harness (330) and the tests (360), rather than having the client service (310) provide the harness (330) and the tests (360). In this scenario, the client machine (300) will not be able to make calls to the service to perform local actions (such as taking a screen shot or drag & drop of a file). However, other functions of the client service (310) may be performed.

F. Performance Monitoring

Performance tests can be written by specifying the uniform resource locator or set of uniform resource locators to be measured and configuring the types of measurements to take, such as by using the harness settings page and/or a configuration file. These settings can instruct the system to measure one or more of the types of page load times (PLT1, PLT2, and/or PLT3) and can run a specified number of iterations. The harness (330) and the stub (350) can start the test (360) and navigate to the specified page uniform resource locator(s) for the specified number of times, possibly clearing the cache between runs, depending upon which set of PLT were specified. After a run has completed, the stub (350) and harness (330) can perform computations on the results, and can output statistics, such as the average, minimum, maximum, and standard deviation of the results. These statistics can be compared to previous runs in the harness user interface (400), or in an external service.

G. Test Orchestration

As noted above, an orchestration service (260) can facilitate distributing and running tests (360) across browsers that are registered with the orchestration service (260). Different types of browsers on different types of client machines can register with the orchestration service (260). For example, a client machine (300) may be prompted to register with the orchestration service (260) by selecting a setting (not shown) on the harness user interface (400) to run in unattended mode. The browser (305) on the client machine (300) can respond by pinging the orchestration service (260) periodically to request a job to run. If the orchestration service (260) does not have any jobs to run, the browser (305) can keep pinging the orchestration service (260) until the browser (305) gets a job from the orchestration service (260). If the orchestration service (260) has a job to run, the orchestration service (260) can send the browser (305) a list of one or more tests (360) to run and the settings (such as the product uniform resource locator) to use during the run. The browser (305) can then execute the set of test(s) (360) and report the results back to the orchestration service (260). The browser (305) can then start the loop again to request a job to run from the orchestration service (260).

An orchestration service job can be started from a harness user interface (400) on a client machine (300). For example, the "ORCHEST. TESTS" tab in FIG. 4 can include a button to be selected to submit a test job to the orchestration service (260). When the job is submitted to the orchestration service (260), the orchestration service (260) can look at all the client machines (210) that are registered with the orchestration service (260) and determine the browser type of the registered machines. The orchestration service (260) can prompt the execution of the job on every browser type that is registered with the service, or on specified browser types. If multiple browsers of the same type are registered with the service, the orchestration service (260) may divide the job on that browser type between one or more of the machines that have that browser type. This can allow the orchestrated testing to be done in parallel so that the job is executed on many machines simultaneously. The orchestration service (260) can respond to the registered machines' requests for work. When the job is done, the orchestration service (260) can store the job results into its local database and the orchestration service (260) can send a message to the client machine (210) and/or an associated user profile that submitted the job, indicating the results of the job. From the harness user interface (400), a user may view the status of jobs that have been submitted to the orchestration service (260), and the results of each job.

Since any client machine (210) that can communicate with the orchestration service (260) through a browser (e.g., any Internet-connected Web browser) can be registered with the orchestration service (260), the registered client machines (210) can include machines that are hosted in the cloud or hosted by a 3rd party. If development is done inside of a private domain and testing is to be done on a cloud device, the orchestration service (260) may automatically open a temporary tunnel between the cloud device and the machine that is hosting the product code so that the cloud device has access to the product machine through a domain firewall. Because all settings can be passed as part of the uniform resource locator, remote client machines can be registered with the orchestration service (260) by simply navigating to the uniform resource locator for the orchestration service (260), with some additional query parameters.

The orchestration service (260) can maintain a list of client machines that are registered with it. The orchestration service (260) may also maintain a list of the last time that each registered client machine sent a request for a job. If the machine has not requested a job for longer than a determined period of time, and the machine has an instance of the client service (310) running on it, the orchestration service (260) may send a request to the client service (310) on the machine to automatically restart the browser (305). For example, this may happen if a job hanged the browser (305). If the browser (305) still does not restart, the orchestration service (260) may respond by providing a notification of the problem, such as by sending an email message.

III. Techniques for Online Application Testing Across Browser Environments

Several techniques for online application testing across browser environments will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques discussed below may be performed at least in part by hardware logic.

Figure 7:
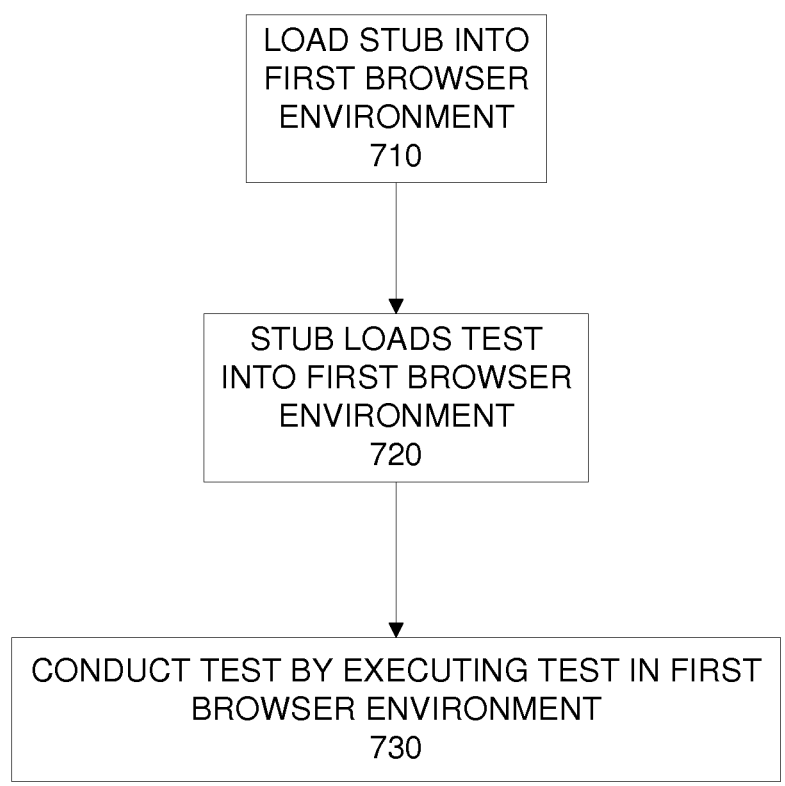
FIG. 7 is a flowchart of a technique for online application testing across browser environments.

Referring to FIG. 7, a technique for online application testing across browser environments will be described. The technique can include loading (710) a stub into a first browser environment of a browser application on a client machine. The stub can be loaded (710) from a domain that is remote from the client machine. The stub can be executed in the first browser environment to load (720) an online application test into the first browser environment. The test can be conducted (730) on an online application from the same domain from which the stub was loaded. Also, the test can be conducted (730) in the first browser environment to produce one or more actions in a second browser environment of the browser on the client machine. The action(s) can include loading one or more digital pages from the application from the domain and into the second browser environment.

In one example, second browser environment can be in a different browser window from the first browser environment. In another example, the second browser environment may be in an inline frame in the first browser environment. In some examples, a second browser environment may not be used. Instead, a test file (e.g., a JavaScript file) may be loaded directly into the first browser environment, and application programming interfaces of the online application being tested can be called in that file.

The technique of FIG. 7 may further include loading a harness into the browser, and the harness can host the stub. For example, the harness can host the stub in an inline frame in the harness, and the inline frame in the harness can be the first browser environment. The domain may be termed a first domain, and loading the harness may include loading the harness from a second domain that is different from the first domain. Also, loading the test into the first browser environment may include loading the test from a second domain that is different from the first domain.

The stub may collect results from the test and return results of the test. Additionally, the technique of FIG. 7 may further include performing one or more computations (averages, etc.) on the results from the test and returning results from the one or more computations.

The stub and the test, and possibly also the harness, may each be defined at least in part by the same scripting language, such as JavaScript.

A stack of multiple task queues may be maintained. Each of the task queues can include at least one task specified in the test, and at least one of the task queues can include multiple tasks specified in the test. The task queues in the stack may be performed in a last-in-first-out order. Also, maintaining the stack may include adding an additional queue to the stack in response to a running task in an existing task in an existing queue in the stack calling for the addition of the additional queue. The additional queue can be run before continuing with running the existing queue. One or more tasks within at least one of the task queues can be performed in an order specified in the test. Also, one or more tasks within at least one of the task queues can be performed in an order specified in a general task library.

The test can specify one or more tasks that can include at least one task that includes an action and a waiter. The waiter can wait for occurrence of a specified event that is different from the action, but can be an effect from performance of the action.

The technique of FIG. 7 may further include responding to a single user input action by automatically instructing multiple different computing machines running different types of browsers to each perform the method of claim 1 and to return results from the test.

The technique of FIG. 7 may further include running a client service on the client machine and outside the browser. This client service can interact with the stub to perform one or more actions indicated in the test.

Figure 8:
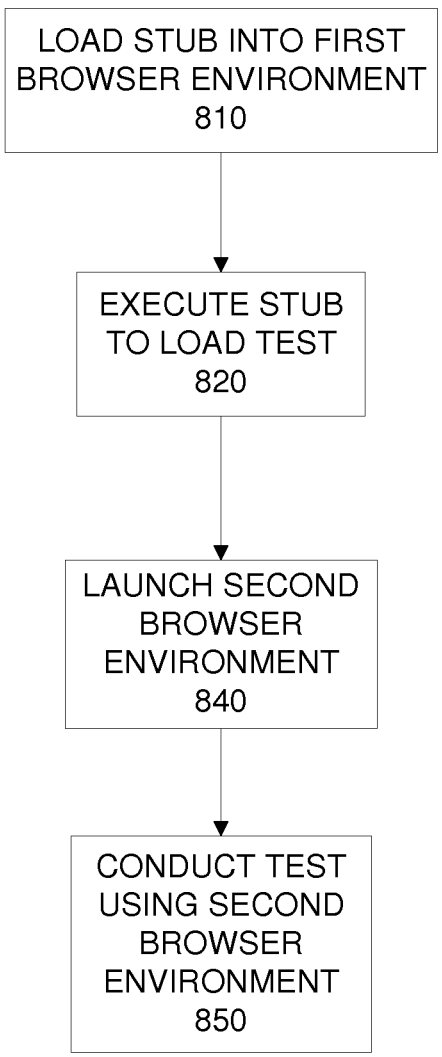
FIG. 8 is a flowchart of another technique for online application testing across browser environments.

Referring now to FIG. 8, another technique for online application testing across browser environments will be discussed. The technique of FIG. 8 can include loading (810) a stub into a first browser environment of a browser application on a client machine. The stub can be loaded (810) from a domain, and can be executed (820) to load an online application test into the first browser environment. The technique can also include launching (840) a second browser environment. The second browser environment can be a browser environment selected from a group consisting of a different browser window from the first browser environment and an inline frame in the first browser environment. A test on an online application from the domain can be conducted (850) using the second browser environment of the browser on the client machine. Conducting (850) the test can include loading one or more digital pages from the application from the domain and into the second browser environment. Conducting (850) the test may also include an abstraction layer (which can be between the test and the second browser environment) relaying information between the test and the second browser environment. The abstraction layer can be configured to interact with the test in the same manner whether the second browser environment is a browser window that is different from a browser window that hosts the first browser environment or whether the second browser environment is an inline frame in the first browser environment.

Figure 9:
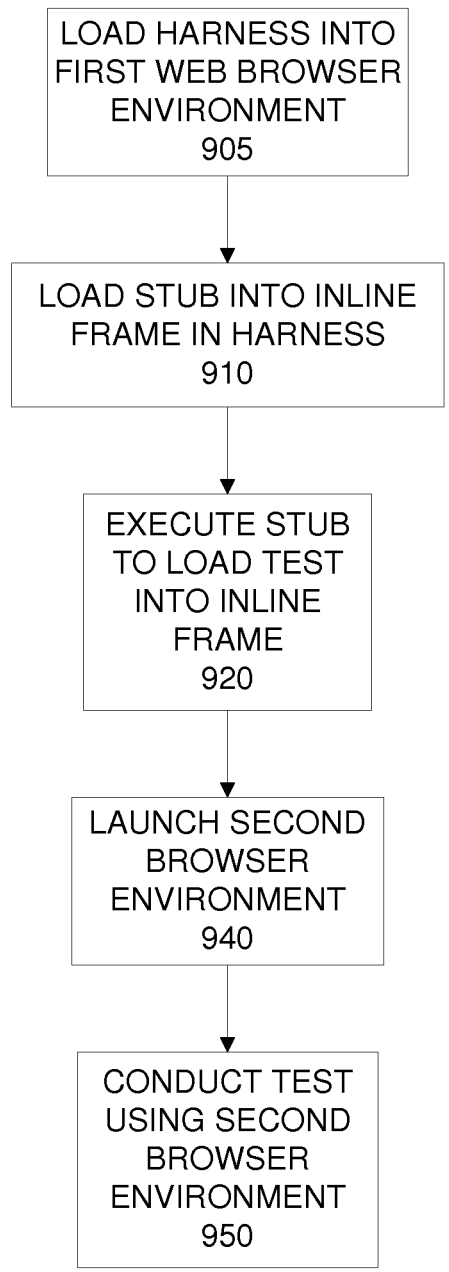
FIG. 9 is a flowchart of yet another technique for online application testing across browser environments.

Referring now to FIG. 9, yet another technique for online application testing across browser environments will be discussed. The technique can include loading (905) a harness in a first browser environment of a browser application on a client machine. The harness can present a user interface for receiving user input that governs performance of a test, and the harness can be defined, at least in part, in a scripting language. The technique of FIG. 9 can further include loading (910) a stub into an inline frame in the harness, with the stub being loaded from a first domain. The stub can be configured to interact with the harness, and the stub can be defined, at least in part, in the scripting language. The technique of FIG. 9 can include responding to user input instructions provided to the harness by executing (920) the stub in the first browser environment to load the test into the inline frame from a second domain. The test can be identified to the stub by the harness, and the test can be defined, at least in part, in the scripting language. The technique can also include launching (940) a second browser environment. The second browser environment can be a browser environment selected from a group consisting of a different browser window from the first browser environment and an inline frame in the first browser environment. The technique can further include conducting (950) the test on an online application from the domain. The test can be conducted (950) using the second browser environment of the browser on the client machine. Conducting (950) the test can include loading one or more digital pages from the application from the domain and into the second browser environment. In conducting (950) the test, an abstraction layer between the stub and the second browser environment can relay information between the test and the second browser environment. The abstraction layer can be configured to interact with the test in the same manner whether the second browser environment is a browser window that is different from a browser window that hosts the first browser environment or whether the second browser environment is an inline frame in the first browser environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A computer-implemented method, comprising:
  loading a stub into a first browser environment of a browser application on a client machine, the stub being loaded from a domain that is remote from the client machine;
  executing the stub in the first browser environment to load an online application test into the first browser environment; and
  conducting the test on an online application from the domain by executing the test in the first browser environment, the executing of the test in the first browser environment producing one or more actions in a second browser environment of the browser on the client machine, the one or more actions comprising loading one or more digital pages from the application into the second browser environment, the second browser environment being an inline frame in the first browser environment.

2. The method of claim 1, wherein the loading of the one or more digital pages from the application comprising loading the one or more digital pages from the domain.

3. The method of claim 1, further comprising loading a harness into the browser, wherein the harness hosts the stub in an inline frame in the harness, wherein the inline frame is the first browser environment.

4. The method of claim 3, wherein the domain is a first domain and wherein loading the harness comprises loading the harness from a second domain that is different from the first domain.

5. The method of claim 1, wherein the domain is a first domain and wherein the loading of the test into the first browser environment comprises loading the test from a second domain that is different from the first domain.

6. The method of claim 1, further comprising the stub collecting results from the test and returning the results from the test, wherein the method further comprises performing one or more computations on the results from the test and returning results from the one or more computations.

7. The method of claim 1, wherein the stub and the test are each defined at least in part by JavaScript.

8. The method of claim 1, further comprising maintaining a stack of multiple task queues, wherein each of the task queues includes at least one task specified in the test, and wherein at least one of the task queues includes multiple tasks specified in the test.

9. The method of claim 8, wherein the task queues in the stack are performed in a last-in-first-out order.

10. The method of claim 8, wherein maintaining the stack comprises adding an additional queue to the stack in response to a running task in an existing task in an existing queue the stack calling for the addition of the additional queue, and running the additional queue before continuing with running the existing queue.

11. The method of claim 8, wherein the one or more tasks within at least one of the task queues is performed in an order specified in the test.

12. The method of claim 8, wherein the one or more tasks within at least one of the task queues is performed in an order specified in a general task library.

13. The method of claim 1, wherein the test specifies one or more tasks comprising at least one task that includes an action and a waiter, the waiter waiting for occurrence of a specified event that is different from the action.

14. The method of claim 1, further comprising responding to a single user input action by automatically instructing multiple different computing machines running different types of browsers to each perform the method of claim 1 and to return results from the test.

15. The method of claim 1, further comprising running a client service on the client machine and outside the browser, the client service interacting with the stub to perform one or more actions indicated in the test.

16. The method of claim 1, wherein the method is performed at least in part by hardware logic.

17. A computer system comprising:
at least one processor; and
memory comprising instructions stored thereon that when executed by at least one processor cause at least one processor to perform acts comprising:
loading a stub into a first browser environment of a browser application on a client machine, the stub being loaded from a domain;
executing the stub in the first browser environment to load an online application test into the first browser environment;
launching a second browser environment, the second browser environment being a browser environment selected from a group consisting of a different browser window from the first browser environment and an inline frame in the first browser environment; and
conducting the test on an online application from the domain using the second browser environment of the browser on the client machine, conducting the test comprising:
loading one or more digital pages from the application from the domain and into the second browser environment; and
an abstraction layer, which is between the test and the second browser environment, relaying information between the test and the second browser environment, the abstraction layer being configured to interact with the test in the same manner whether the second browser environment is a browser window that is different from a browser window that hosts the first browser environment or whether the second browser environment is an inline frame in the first browser environment.

18. A computer system comprising:
at least one processor; and
memory comprising instructions stored thereon that when executed by at least one processor cause at least one processor to perform acts comprising:
loading a stub into a first browser environment of a browser application on a client machine, the stub being loaded from a domain that is remote from the client machine;
executing the stub in the first browser environment to load an online application test into the first browser environment; and
conducting the test on an online application from the domain by executing the test in the first browser environment, the executing of the test in the first browser environment producing one or more actions in a second browser environment of the browser on the client machine, the one or more actions comprising loading one or more digital pages from the application into the second browser environment, the second browser environment being an inline frame in the first browser environment.

19. The system of claim 18, wherein the loading of the one or more digital pages from the application comprising loading the one or more digital pages from the domain.

20. The system of claim 18, wherein the acts further comprise loading a harness into the browser, wherein the harness hosts the stub in an inline frame in the harness, wherein the inline frame is the first browser environment.

* * * * *